United States Patent
Jhunjhunwala et al.

(10) Patent No.: US 8,452,126 B2
(45) Date of Patent: May 28, 2013

(54) METHOD FOR AUTOMATIC MISMATCH CORRECTION OF IMAGE VOLUMES

(75) Inventors: Priyavrat Jhunjhunwala, Bangalore (IN); Sheshadri Thiruvenkadam, Bangalore (IN); Rakesh Mullick, Bangalore (IN); Sumit Kumar Nath, Bangalore (IN)

(73) Assignee: General Electric Company, Niskayuna, NY (US)

( * ) Notice: Subject to any disclaimer, the term of this patent is extended or adjusted under 35 U.S.C. 154(b) by 92 days.

(21) Appl. No.: 13/220,764

(22) Filed: Aug. 30, 2011

(65) Prior Publication Data
US 2012/0321195 A1 Dec. 20, 2012

(51) Int. Cl.
*G06K 9/32* (2006.01)

(52) U.S. Cl.
USPC ............ 382/294; 382/131; 382/203; 382/204

(58) Field of Classification Search
None
See application file for complete search history.

(56) References Cited

U.S. PATENT DOCUMENTS

| | | | | |
|---|---|---|---|---|
| 5,568,384 | A * | 10/1996 | Robb et al. ..................... | 715/202 |
| 2006/0056698 | A1 * | 3/2006 | Jolly et al. ..................... | 382/190 |
| 2008/0019580 | A1 * | 1/2008 | Ohyu et al. ..................... | 382/130 |
| 2008/0205721 | A1 * | 8/2008 | Udupa et al. ................... | 382/128 |

OTHER PUBLICATIONS

Lok Ming Lui; Sheshadri Thiruvenkadam; Yalin Wang; Paul M. Thompson; and Tony F. Chan, "Optimized Conformal Surface Registration with Shape-based Landmark Matching", Feb. 19, 2010, SIAM J. Imaging Sciences, vol. 3, No. 1, pp. 52-78.*

* cited by examiner

*Primary Examiner* — Andrew W Johns
*Assistant Examiner* — Siamak Harandi
(74) *Attorney, Agent, or Firm* — Seema S. Katragadda

(57) ABSTRACT

A method for automatic mismatch correction is presented. The method includes identifying a feature of interest in a reference image volume and a target image volume. Furthermore, the method includes computing a cost matrix based on one or more pairs of image slices in the reference image volume and the target image volume. The method also includes identifying one or more longest common matching regions in the reference image volume and the target image volume based on the computed cost matrix. In addition, the method includes aligning the reference image volume and the target image volume based on the identified one or more longest common matching regions. A non-transitory computer readable medium including one or more tangible media, where the one or more tangible media include code adapted to perform the method for automatic mismatch correction is also presented. Systems and non-transitory computer readable medium configured to perform the method for automatic mismatch correction of image volumes are also presented.

22 Claims, 8 Drawing Sheets

METHOD FOR AUTOMATIC MISMATCH CORRECTION OF IMAGE VOLUMES

CROSS REFERENCE TO RELATED APPLICATIONS

This non-provisional application claims the benefit of priority under 35 U.S.C. §119(a)-(d) or (f) to India Provisional Patent Application Serial No. 2056/CHE/2011, filed Jun. 17, 2011, which is herein incorporated in its entirety by reference.

BACKGROUND

Analysis of computed tomography (CT) image volumes by clinicians, such as radiologists, calls for co-registration of the image volumes. Particularly, in oncology studies, it is desirable to co-register longitudinal image volumes having disparate coverage areas. Accordingly, three-dimensional (3D) image volume registration is an essential feature for diagnosis, therapy, and treatment follow-up when dealing with longitudinal (i.e., multi-time point) oncology studies. The use of multi-modality radiological images, such as, but not limited to, CT images, magnetic resonance (MR) images, positron emission tomography (PET) images, and/or ultrasound (US) images, as well as histopathological images makes this task extremely challenging. The success of most registration algorithms is dependent on a key assumption of significant overlap between image volumes. Unfortunately, this assumption may not be satisfied for oncology studies where significant amounts of field-of-view (FOV) or coverage mismatch may occur between multi-time point image volumes. This mismatch may be a result of modality (e.g., long acquisition time for magnetic resonance imaging (MRI)) or physiological (e.g., dose related issues for CT) limitations. A manual mismatch correction prior to the main registration of the image volumes is an onerous task due to the sheer number of exams (i.e., image volumes) that need to be co-registered.

Certain presently available techniques attempt to address this problem of mismatch correction by building an all-pair cost matrix between slices in the two (i.e., reference and target) image volumes. Each element of this cost matrix is typically computed by a weighted sum of a non-parametric Minkowski distance and a deformable displacement between pre-segmented regions of interest (ROIs) in both slices. Unfortunately, estimation of a minimum-cost straight line that determines the best matching zone of both image volumes along the axial direction entails an exhaustive search of this matrix. Other techniques for solving the mismatch problem account for invariant features in both image volumes and generate one-dimensional (1D) energy profiles that are subsequently matched with a model 1D profile. However, use of these techniques calls may produce erroneous results.

Additionally, other currently available techniques have attempted to address the mismatch correction problem by implementing a 1D histogram matching of slices followed by explicit two-dimensional (2D)-2D image registration between slices, thereby resulting in a laborious and expensive process. Certain other presently available techniques entail use of an additional step of image segmentation to identify corresponding anatomies in the two image volumes and the image volumes are registered based on relative difference in position. However, these techniques are disadvantageously dependent on robust image segmentation methods, which have a tendency to fail for partial coverage of organs and/or anatomy in the relevant volumes.

BRIEF DESCRIPTION

In accordance with aspects of the present technique, a method for automatic mismatch correction of image volumes is presented. The method includes identifying a feature of interest in a reference image volume and a target image volume. Furthermore, the method includes computing a cost matrix based on one or more pairs of image slices in the reference image volume and the target image volume. The method also includes identifying one or more longest common matching regions in the reference image volume and the target image volume based on the computed cost matrix. In addition, the method includes aligning the reference image volume and the target image volume based on the identified one or more longest common matching regions. A non-transitory computer readable medium including one or more tangible media, where the one or more tangible media include code adapted to perform the method for automatic mismatch correction of image volumes is also presented.

In accordance with another aspect of the present technique, a correction system is presented. The correction system includes a mismatch correction platform configured to identify a feature of interest in a reference image volume and a target image volume, compute a cost matrix based on one or more pairs of image slices in the reference image volume and the target image volume, identify one or more longest common matching regions in the reference image volume and the target image volume based on the computed cost matrix, and align the reference image volume and the target image volume based on the identified one or more longest common matching regions.

In accordance with yet another aspect of the present technique, an imaging system is presented. The imaging system includes an acquisition subsystem configured to acquire image data, wherein the image data is representative of an anatomical region in an object of interest. Also, the imaging system includes a processing subsystem in operative association with the acquisition subsystem and including a mismatch correction platform configured to identify a feature of interest in a reference image volume and a target image volume, compute a cost matrix based on one or more pairs of image slices in the reference image volume and the target image volume, identify one or more longest common matching regions in the reference image volume and the target image volume based on the computed cost matrix, align the reference image volume and the target image volume based on the identified one or more longest common matching regions, and register the reference image volume and the target image volume to generate a registered image.

DRAWINGS

These and other features, aspects, and advantages of the present disclosure will become better understood when the following detailed description is read with reference to the accompanying drawings in which like characters represent like parts throughout the drawings, wherein.

Figures 4A, 4B:
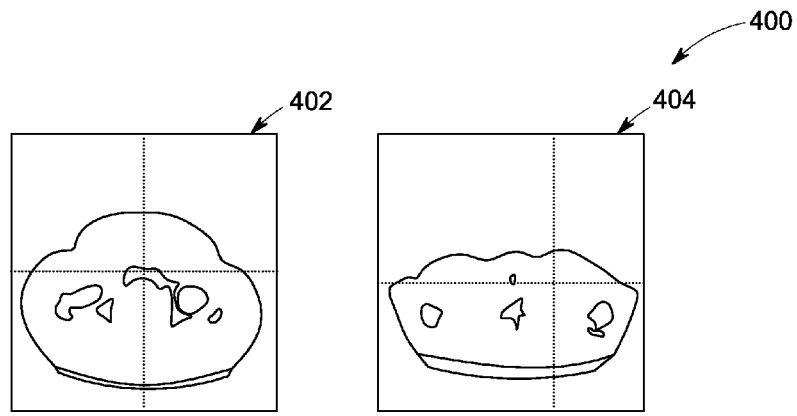
Figure 5A:
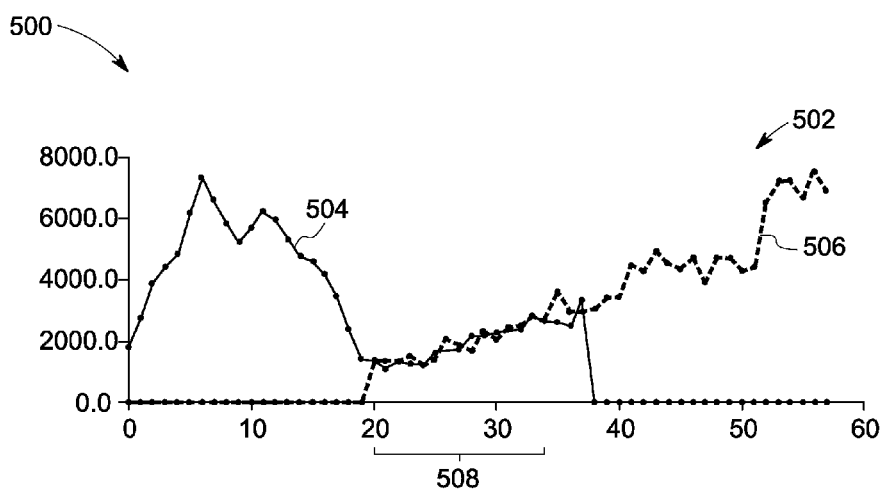
Figure 5B:
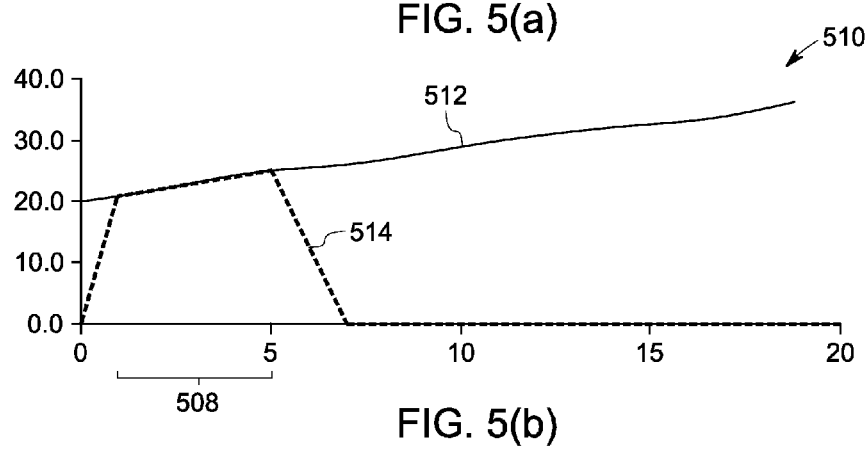
Figure 6A:
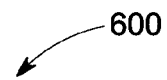
Figure 6A:
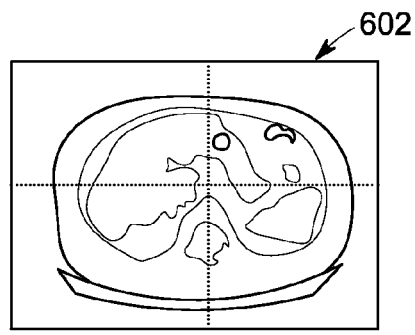
Figure 6B:
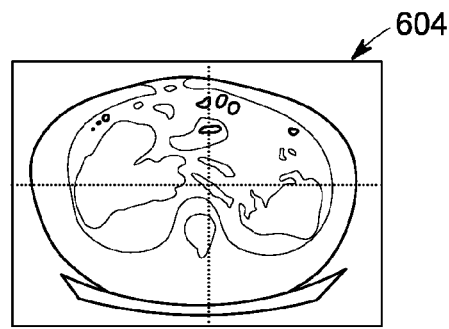
Figure 7A:
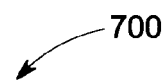
Figure 7A:
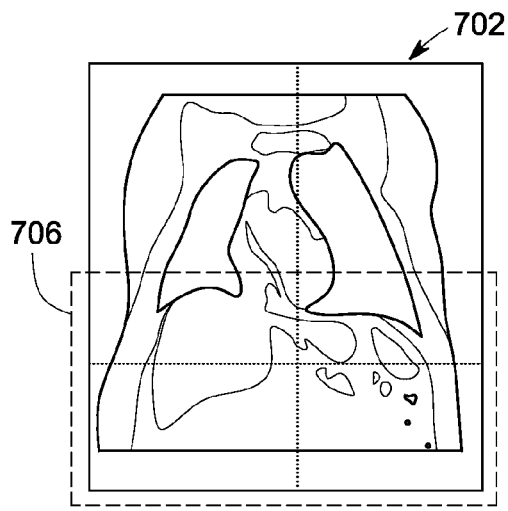
Figure 7B:
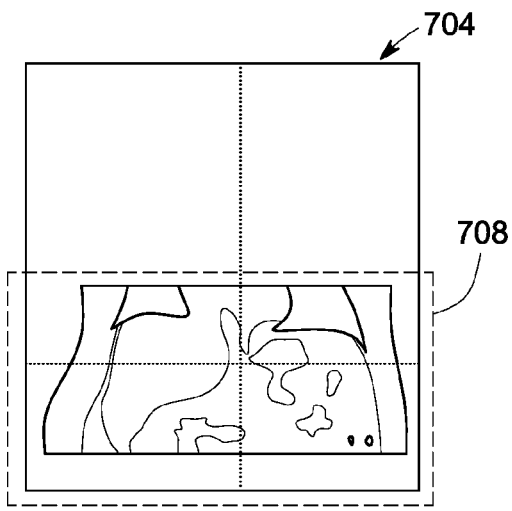
Figure 8A:
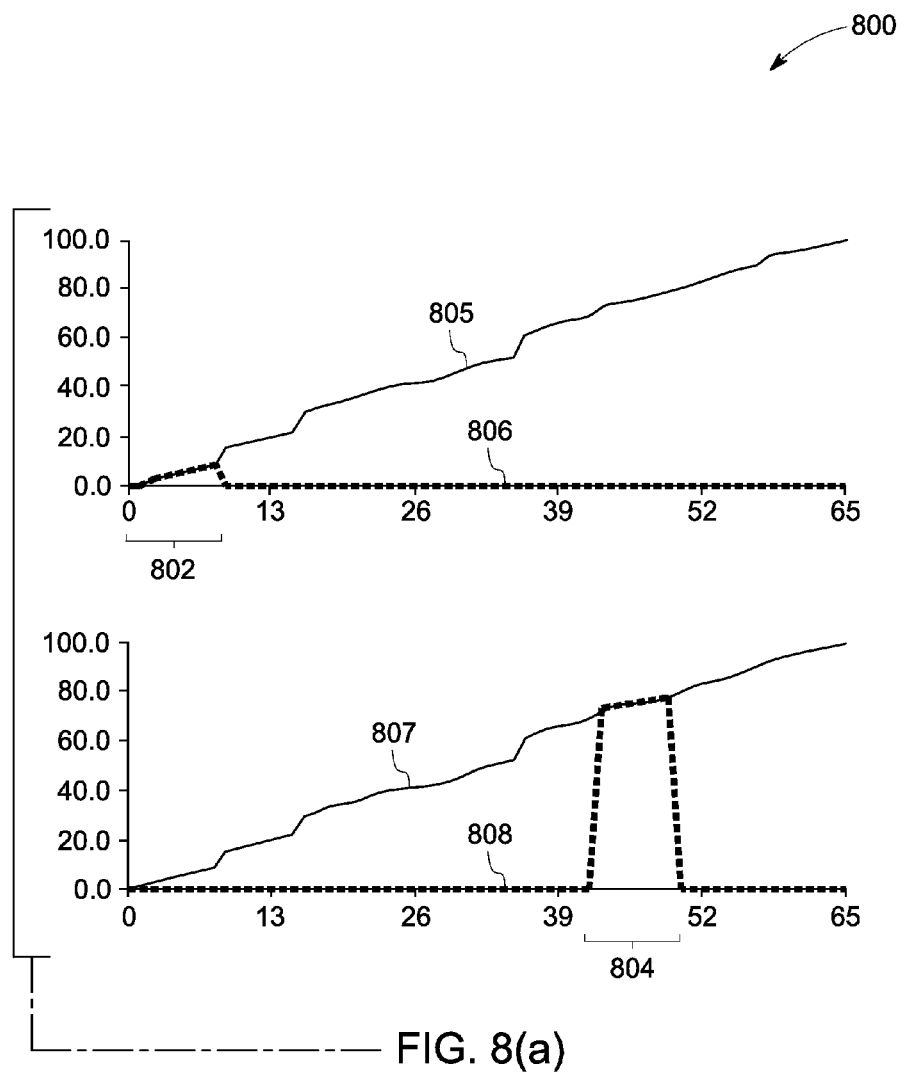
Figures 8B, 8C:
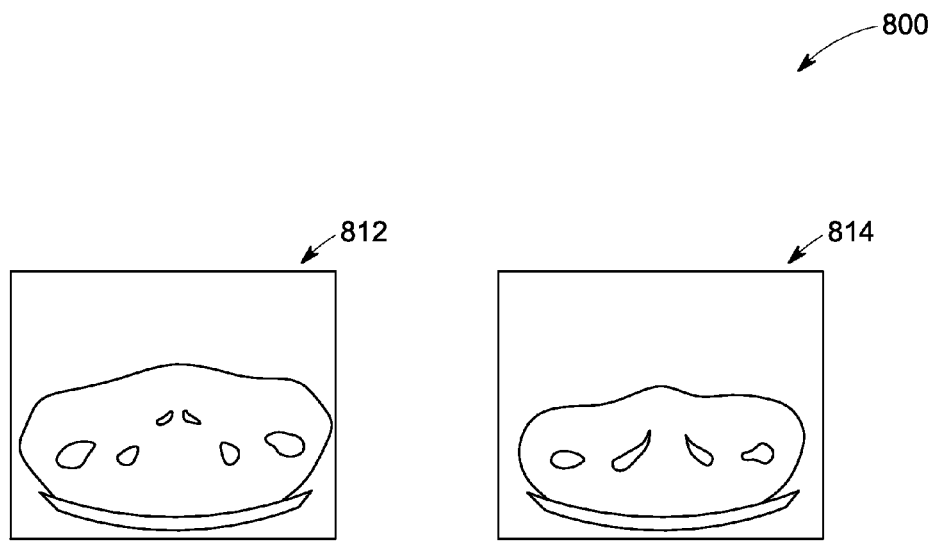
Figures 8D, 8E:
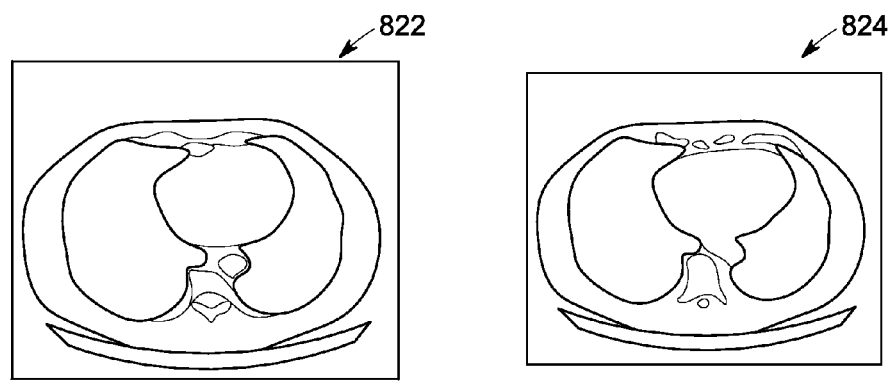
Figures 9A, 9B:
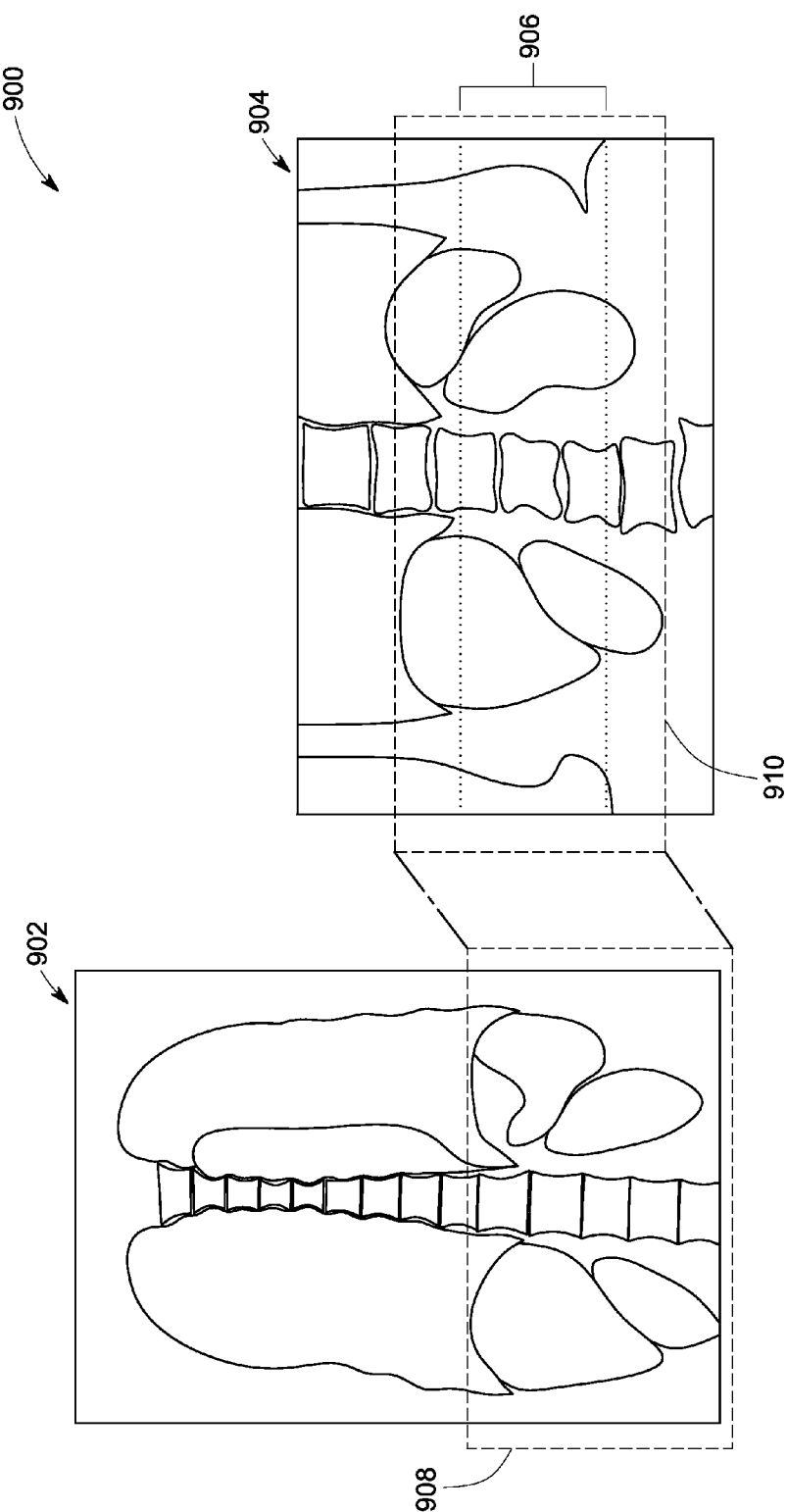
Figure 10:
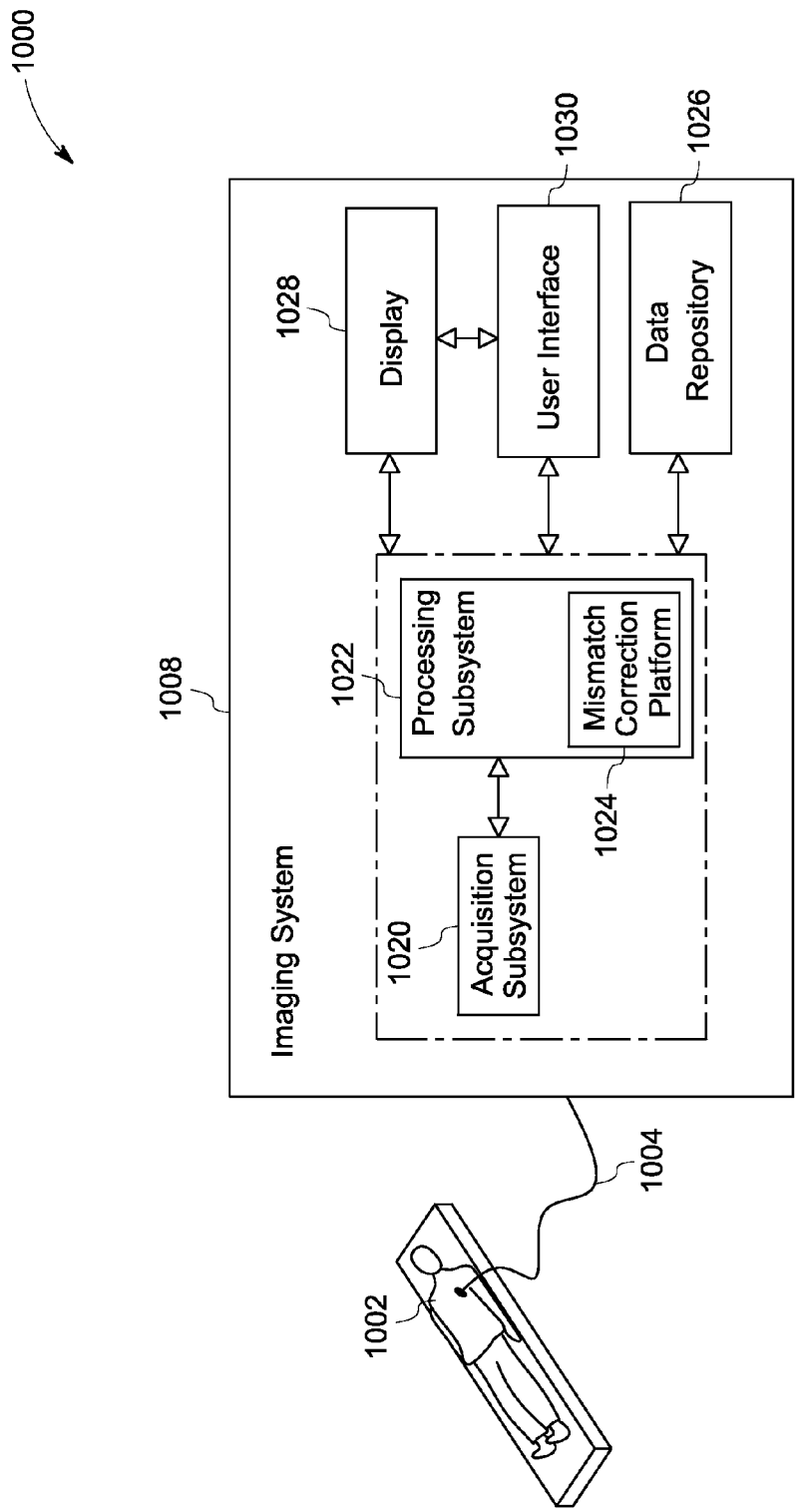

FIGS. 4(a) and 4(b) are pictorial representations of bones in pelvic and shoulder regions along an axial direction;

FIG. 5(a) is a graphical representation of axial bone profile plots and FIG. 5(b) is a graphical representation of use of the Complete Sum-of-Squares Difference-maximum-weighted non-crossing matching (CSSD-MWNCM) technique along the axial direction on the image volumes of FIG. 4, in accordance with aspects of the present disclosure;

FIGS. 6(a) and 6(b) are pictorial representations of a pair of axial image slices corresponding to a matching region of FIG. 5;

FIGS. 7(a) and 7(b) are pictorial representations of a pair of coronal slices corresponding to the axial slices of FIG. 6;

FIG. 8(a) is a graphical representation of use of the CSSD-MWNCM technique along the axial direction for identification of multiple longest matching regions and FIGS. 8(b)-8(e) are pictorial representations of axial image slices in the image volumes, in accordance with aspects of the present disclosure;

FIGS. 9(a) and 9(b) are pictorial representations of coronal views of a typical two time-point oncology study showing the abdominal region as the region of interest; and FIG. 10 is a diagrammatical illustration of a system for automated correction of mismatch in longitudinal image volumes.

DETAILED DESCRIPTION

As will be described in detail hereinafter, a method and system for the automated mismatch correction of multi-point (longitudinal) image volumes are presented. Use of these approaches enhances the quality of diagnosis, therapy and/or follow-up studies.

Figure 1:
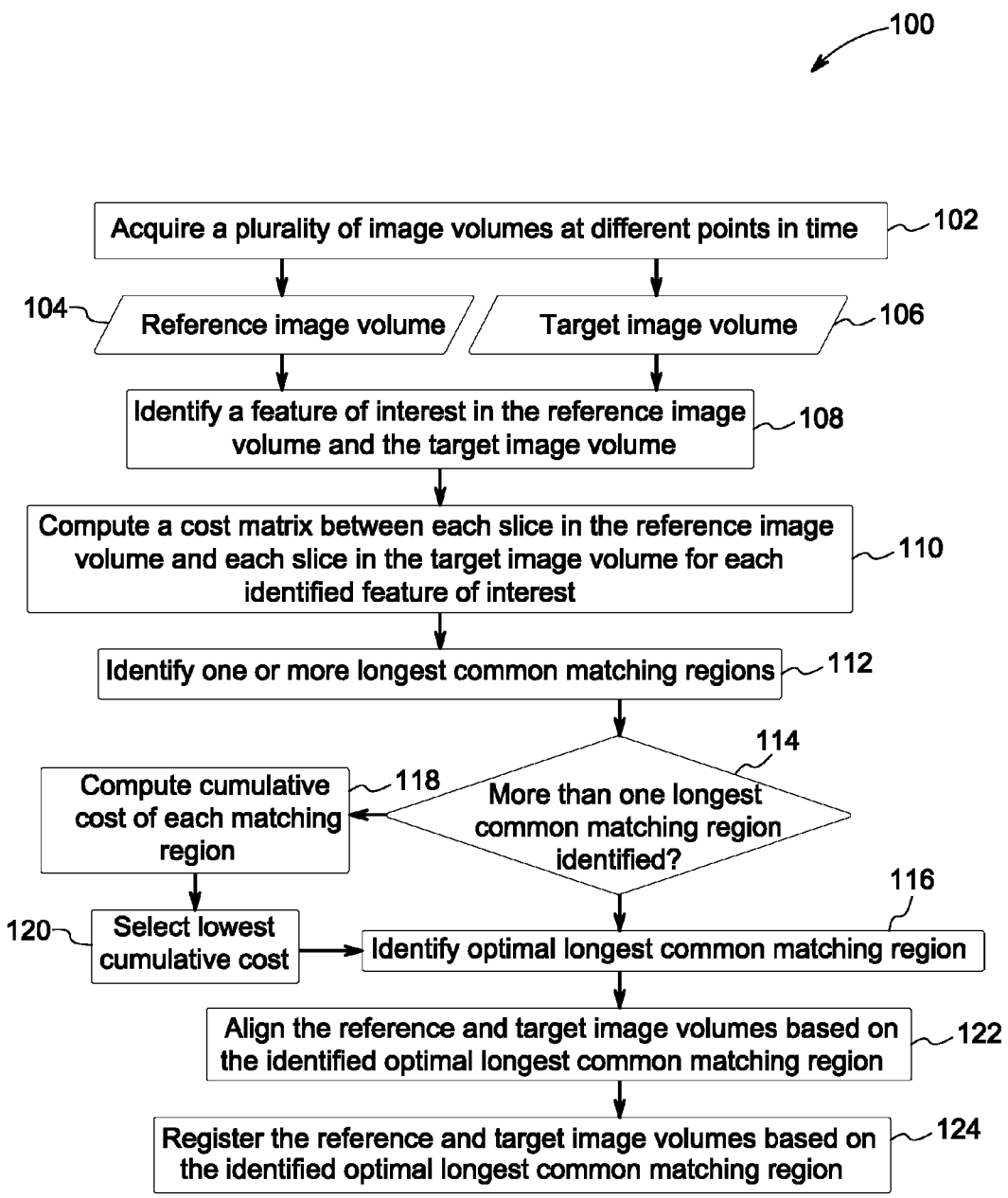
FIG. 1 is a flow chart depicting an exemplary method for automated mismatch correction of longitudinal image volumes, in accordance with aspects of the present disclosure.

Referring now to FIG. 1, a flow chart 100 depicting an exemplary method for the automated mismatch correction of longitudinal image volumes is presented. As used herein, the term "longitudinal image volumes" is used to refer to image volumes corresponding to an object of interest acquired at different points in time. The method starts at step 102 where one or more longitudinal image volumes are acquired. Particularly, image volumes representative of a region of interest in an object of interest may be acquired. Also, the object of interest may be a patient, in certain embodiments. By way of example, image volumes representative of a thoracic region in the patient may be acquired. These longitudinal image volumes may be used in the diagnosis, therapy and/or follow-up studies.

The method 100 may be described in a general context of computer executable instructions. Generally, computer executable instructions may include routines, programs, objects, components, data structures, procedures, modules, functions, and the like that perform particular functions or implement particular abstract data types. In certain embodiments, the computer executable instructions may be located in computer storage media, such as a memory, local to an imaging system (see FIG. 10) and in operative association with a processing subsystem. In certain other embodiments, the computer executable instructions may be located in computer storage media, such as memory storage devices, that are removed from the imaging system. Moreover, the method for automated mismatch correction includes a sequence of operations that may be implemented in hardware, software, or combinations thereof.

Moreover, in one embodiment, the longitudinal image volumes may be acquired employing a single modality imaging system. By way of example, the longitudinal image volumes representative of an anatomical region of interest in the patient may be acquired using a computed tomography (CT) imaging system.

However, the longitudinal image volumes may also be acquired using a multi-modality imaging system. Accordingly, the longitudinal image volumes representative of the anatomical region of interest in the patient may be acquired using a multi-modality imaging system, such as a CT imaging system, a magnetic resonance (MR) imaging system, a CT-positron emission tomography (CT-PET) imaging system, a SPECT imaging system, an X-ray imaging system, and the like. It may be noted that if the image volumes are acquired using a multi-modality imaging system, there may exist a lack of standardization between the multi-modal images. This lack of standardization may disadvantageously result in erroneous matching of the image volumes. For example, if it is desirable to match bones in multi-modal images such as a CT image and an MR image, identification of "bony" voxels in the CT image and the MR image is a difficult task as the intensity of the "bony" pixels in the MR image is different from the "bony" pixels present in the CT image. In accordance with aspects of the present technique, if the image volumes are acquired using a multi-modality imaging system, a feature space in each of the acquired image volumes may be standardized in order to match data in the multi-modal space.

In certain embodiments, the standardization of the feature space may entail a comparison of image volumes acquired from the two different imaging modalities. In order to compare the two image volumes from the two different imaging modalities, an appropriate cost function may be computed. This cost function may then be used to compare like features in the two image volumes, such as, but not limited to, intensity, gradient, structure, to assess a match and/or mismatch. In certain embodiments, the comparison may be accomplished using intensity based methods, such as an entropy based method, that involves the computation of mutual information between the slices of the image volumes. Additionally, for image volumes acquired using structurally rich modalities, the comparison may be accomplished by comparing gradient maps derived from each of the image volumes or by mapping one or both image volumes to a pseudo-space that facilitates a meaningful comparison.

As noted hereinabove, the plurality of acquired image volumes may be representative of image volumes acquired at multiple points of time. Accordingly, there may be a mismatch in coverage area across this plurality of image volumes. Registering these "mismatched" image volumes may disadvantageously result in erroneous diagnosis and/or treatment. The method for the automated mismatch correction of the longitudinal image volumes depicted in FIG. 1 circumvents the shortcomings of the currently available techniques and presents a robust technique for the automated correction of any mismatch of coverage area across the plurality of acquired image volumes. It may be noted that although the method of FIG. 1 is described with reference to CT longitudinal image volumes, use of other combinations of image volumes obtained using imaging systems such as, but not limited to, an MR imaging system, a PET imaging system, an X-ray imaging system, or a SPECT imaging system, is also envisaged.

Furthermore, it may be noted that the method depicted in FIG. 1 is described with reference to two (2) image volumes, a first image volume 104 and a second image volume 106. However, the present technique may be extended to any number of acquired image volumes. It is desirable to correct any mismatch in the coverage area between the first and second image volumes to aid in the diagnosis, therapy and/or follow-up studies. To that end, the method of FIG. 1 presents a technique for the automated correction of any mismatch in coverage area in the first and second image volumes 104, 106. Moreover, the first image volume 104 may be representative of a reference image volume acquired at a first point in time. In addition, the second image volume 106 may be representative of a target image volume acquired at a second point in time that is typically later than the first point in time. It may be noted that the reference image volume 104 and/or the target image volume 106 may include a corresponding set of one or more image slices.

In accordance with exemplary aspects of the present technique, the method for automated mismatch correction of longitudinal image volumes, such as the reference image volume 104 and the target image volume 106, entails computation of a cost matrix. To that end, a feature of interest in each of the reference image volume 104 and the target image volume 106 is identified, as depicted by step 108. In certain embodiments, the feature of interest in the reference and target image volumes 104, 106 may include an invariant feature in the reference and target image volumes 104, 106. In one embodiment, the feature of interest may be a collection or count of the bone voxels representative of the skeletal organ or system. However, in certain other embodiments, the feature of interest may include an anatomical region of interest, a curvature of the anatomical region of interest, an intensity of the anatomical region of interest, or combinations thereof. Additionally, in certain embodiments, the feature of interest may include derivations of the anatomical region of interest such as a distance transform of a segmented bone mask. Moreover, in certain embodiments, the lungs regions, the diaphragm, and the liver may be representative of examples of the anatomical region of interest.

Once the features of interest are identified in the reference and target image volumes 104, 106, the cost matrix between all pairs of image slices in the reference image volume 104 and the target image volume 106 is computed, as indicated by step 110. In one embodiment, each element of the cost matrix is computed based on a Complete Sum of Squares Differences (CSSD) cost function. It may be noted that given two images, the CSSD cost function represents the all-pair (i.e., every pixel in the reference image volume 104 to every other pixel in the target image volume 106 image) dissimilarity between the reference and target image volumes 104, 106. Subsequently, the dissimilarity cost so computed is converted to a similarity cost via use of a non-linear transform. It may be noted that other transforms may also be employed to aid in the conversion of the dissimilarity cost to the similarity cost.

As will be appreciated, the computation of the CSSD cost function corresponding to all the pixels in the reference image volume 104 and the target image volume 106 is a laborious and computationally intensive process. In accordance with aspects of the present technique, the reference and target image volumes 104, 106 may be processed to improve the efficiency of the matching process. In certain embodiments, the reference and target image volumes 104, 106 are processed to identify a feature of interest in the reference and target image volumes 104, 106 and the CSSD cost function corresponding to only the identified feature of interest is computed. For example, if the reference and target image volumes 104, 106 include CT image volumes, then a feature that does not undergo substantive changes over time may be may be identified as the feature of interest. By way of example, a bone may be identified as the feature of interest.

Accordingly, in one embodiment, the reference and target image volumes 104, 106 may be processed via a thresholding operation to extract the bone from the reference and target image volumes 104, 106. Consequent to the thresholding operation, bone pixels or voxels in each of the reference and target image volumes 104, 106 may be identified.

Once the features of interest in the reference and target image volumes 104, 106 are identified, the CSSD cost function is computed based only on the features of interest identified in the reference and target image volumes 104, 106. By way of example, in certain embodiments, the computation of the CSSD cost function entails the computation of the CSSD cost function corresponding to only the bone pixels/voxels, thereby reducing the number of computations necessary to populate the cost matrix. It may be noted that if it is desirable to identify other features of interest in the reference and target image volumes 104, 106, other image processing techniques may be employed to extract the desired features of interest.

Moreover, in certain embodiments, the reference image volume 104 may be scanned at a first separation, while the target image volume 106 may be scanned at a second separation that is different from the first separation. Consequently, there exists a disparity in the thickness of image slices in the reference and target image volumes 104, 106. This disparity may disadvantageously result in erroneous matching of image slices in the reference and target image volumes 104, 106. In accordance with aspects of the present technique, this disparity may be circumvented by normalizing the reference and target image volumes 104, 106 based on the respective separations. In one embodiment, the image slices in both the reference and target image volumes 104, 106 may be down sampled such that the corresponding image slices are separated by a substantially similar distance. Down sampling the reference and target image volumes 104, 106 as described hereinabove minimizes the disparity in coverage area between the reference and target image volumes 104, 106.

As noted hereinabove, the cost matrix between all pairs of image slices in the reference image volume 104 and the target image volume 106 is computed. Particularly, each element in this cost matrix is computed by employing the CSSD cost function. In one embodiment, a sum-of squares difference of each identified feature of interest in the reference image volume 104 with each identified feature of interest in the target image volume 106 is computed. These values are employed to populate the cost matrix.

Once the cost matrix is generated, one or more longest common matching regions in the reference image volume 104 and the target image volume 106 is identified, as indicated by step 112. In one embodiment, the one or more longest common matching regions may be identified by identifying a line corresponding to a set of contiguous matching image slices in the reference image volume 104 and the target image volume 106. It may be noted that in certain embodiments, the line corresponding to the set of contiguous matching image slices may be a straight line. Furthermore, the line corresponding to a set of contiguous matching image slices in the reference image volume 104 and the target image volume 106 is identified by imposing a non-crossing constraint on the reference and target image volumes 104, 106. In addition, a non-linear, monotonically increasing mapping between the image slices in the reference and target image volumes 104, 106. Is computed. Subsequently, at least one longest common matching region may be extracted by computing a difference between each matching pair of image slices. Moreover, a run length of the computed difference values may be determined. Additionally, the difference values with the longest run length may be identified as the longest common matching region.

Moreover, it may be noted that in certain situations, one or more longest common matching regions of substantially similar run lengths may be identified. In accordance with aspects of the present technique, a technique to break a "tie" between the one or more longest common matching regions is presented. Accordingly, at step 114, a check is carried out to verify if more than one longest common matching region is identified at step 112. At step 114, if it is determined that only one longest common matching region is identified at step 112, then that longest common matching region is determined to be representative of an optimal longest common matching region, as depicted by step 116.

However, at step 114, if it is determined that more than one longest common matching region is identified at step 112, then it is desirable to break the tie. According to aspects of the present technique, as indicated by step 118, a cumulative cost of each matching set of contiguous image slices based on corresponding entries in the cost matrix generated at step 110 is computed. Subsequently, at step 120, the cumulative cost with a lowest value is identified. Moreover, a matching set of contiguous image slices corresponding to the lowest cumulative cost is selected to be representative of an optimal common region matching region.

Furthermore, it may be noted that the longest common matching region is representative of portions of the reference and target image volumes 104, 106 that are present in both the reference and target image volumes 104, 106. Once the optimal common matching region is identified, the reference and target image volumes 104, 106 may be aligned based on the identified optimal longest common matching region, as indicated by step 122. To that end, a displacement between the corresponding image slices in the reference image volume 104 and the target image volume 106 is determined. By way of example, a linear displacement of a first image slice in the reference image volume 104 and a corresponding image slice in the target image volume 106 is determined. Subsequently, linear displacements corresponding to the other image slices in the reference image volume 104 and the corresponding matching image slices in the target image volume 106 are determined.

The linear displacements so determined are then employed to compute an offset between the reference image volume 104 and the target image volume 106. Additionally, the computed offset is used to estimate a transform of the target image volume 106. In certain embodiments, the transform may include a linear translation. Accordingly, based on the computed offset, a desired linear translation required to translate the target image volume 106 is determined. Subsequently, the target image volume 106 is translated based on the determined linear translation to align the target image volume 106 with the reference image volume 104. Furthermore, once the reference and target image volumes 104, 106 are aligned, the reference and target image volumes 104, 106 are registered based on the optimal longest common matching region to generate a registered image, as indicated by step 124.

In accordance with further aspects of the present technique, an automated mismatch correction may also be performed on a sub-region of interest in the registered image. Accordingly, steps 108-124 may be performed on a desired sub-region in the registered image to provide a refined mismatch correction corresponding to the sub-region in the reference and target image volumes 104, 106.

Implementing the method for automated mismatch correction described hereinabove provides a robust technique for registering longitudinal image volumes without any explicit pair-wise registration of image slices. Steps 108-124 can be better understood with reference to FIGS. 2-10.

Figure 2:
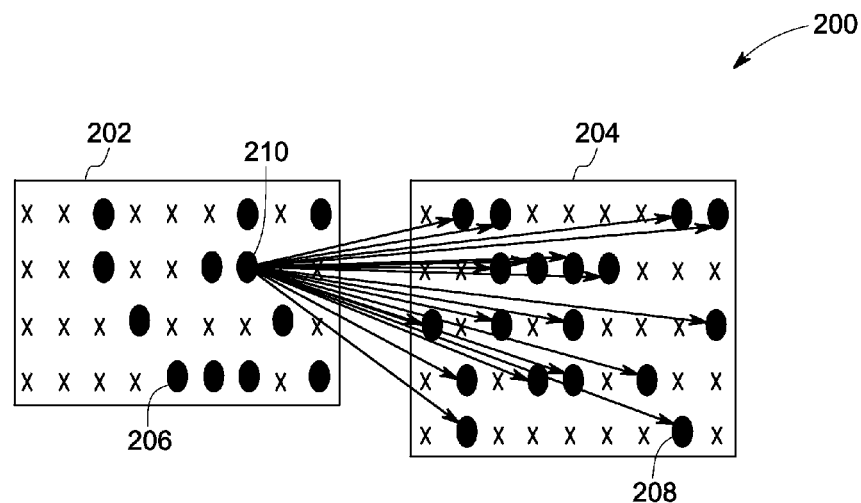
FIG. 2 is a diagrammatical representation of computation of a Complete Sum-of-Squares Difference (CSSD) cost function between a reference image volume and a target image volume, in accordance with aspects of the present disclosure.

FIG. 2 is a diagrammatical representation 200 of a computation of the cost matrix between the reference image volume 104 (see FIG. 1) and the target image volume 106 (see FIG. 1), in accordance with aspects of the present technique. Particularly, in FIG. 2 reference numeral 202 is representative of an $m^{th}$ image slice in the reference image volume 104, while an $n^{th}$ image slice in the target image volume 106 is generally represented by reference numeral 204. Also, reference numeral 206 is representative of the identified features of interest in the $m^{th}$ image slice 202 of the reference image volume 104 and reference numeral 208 is representative of the identified features of interest in the $n^{th}$ image 204 slice of the target image volume 106. As previously noted, a CSSD cost function for each pair of image slices is computed to populate the cost matrix. To that end, according to aspects of the present technique, for a given feature of interest 206 in $m^{th}$ slice 202 of the reference image volume 104, a CSSD cost function is computed by comparing that feature of interest 206 with all the features of interest 208 in the $n^{th}$ image slice 206.

By way of example, if $S_{Ref}$ is representative of the $m^{th}$ slice 202 in the reference image volume 104 and $S_{Tgt}$ is representative of the nth slice 204 in the target image volume 106, then the CSSD cost function for an $i^{th}$ feature of interest 210 in $S_{Ref}$ (i.e., $S_{Ref[i]}$) is computed by comparing $S_{Ref[i]}$ with all the identified features of interest in $S_{Tgt}$ (i.e., $S_{Tgt[j]}: \forall j \in S_{Tgt}$). This process of computing the CSSD cost function may be repeated for each identified feature of interest 206 in the $m^{th}$ slice 202 of the reference image volume 104.

Subsequently, the process of computing the CSSD cost function is repeated for all pairs of image slices. For example, the CSSD cost function for all pairs of the image slices in the reference image volume 104 and the image slices in the target image volume 106 are computed. The computation of the CSSD cost function will be described in greater detail hereinafter.

It may be noted that computing the CSSD cost function even with a reduced set of identified features of interest, such as the features of interest 206 in the reference image volume 104 and the features of interest 208 in the target image volume 106, the computation of the CSSD cost function is generally computationally intensive. Accordingly, the computation of the CSSD cost function may be reformulated in the continuous domain. To that end, let u: $R^n \rightarrow R$ be a Lipschitz continuous function, and for r∈R, the isocontour x∈$R^n$|u(x)=r is a smooth (n−1) dimensional hypersurface in $R^n$. If f:$R^n \rightarrow R$ is continuous and summable, then employing a co-area formula:

$$\int_{R^n} f(x)|\nabla u(x)|dx = \int_{-\infty}^{+\infty}\left(\int_{u(x)=r} f(x)ds\right)dr \quad (1)$$

Let I, J represent a pair of images in $R^n$ with domains $\Omega_1$ and $\Omega_2$, respectively. The CSSD in a continuous domain between these images is computed as:

$$CSSD(I,J)=\int_{y \in \Omega_2}(\int_{x \in \Omega_1}(I(x)-J(y))^2|\nabla(x)dx|)|\nabla J(y)|dy \quad (2)$$

Employing the co-area formula, the inner integral in Eqn. (2) may be modified as:

$$\int_{y \in \Omega_2}(\int_\lambda \int_{(I(x)=\lambda)}(\lambda-J(y))^2 ds d\lambda)|\nabla J(y)|dy \quad (3)$$

Also, the outer integral in Eqn. (2) may be modified as:

$$\int_\mu \int_{(J(y)=\mu}(\int_\lambda \int_{(I(x)=\lambda}(\lambda-\mu)^2 ds d\lambda)dt d\lambda \quad (4)$$

Rearranging the modified integral results in:

$$\int_\mu \int_\lambda (\int_{J(y)=\lambda} dt)(\int_{I(x)=\lambda} ds) d\lambda d\mu \quad (5)$$

The terms:

$$H_I(\lambda) = \int_{J(y)=\mu} dt, H_J(\mu) = \int_{I(x)=\lambda} ds$$

are generally representative of histograms and can be interpreted as lengths of isocontours in the continuous domain. Accordingly, the CSSD in a continuous domain can be represented as:

$$CSSD(I,J) = \int_\mu \int_\lambda H_I(\lambda) H_J(\mu) (\lambda-\mu)^2 d\lambda d\mu \quad (6)$$

Approximating the continuous histograms by their corresponding discrete counterparts (for example, a one-dimensional (1D) vector of counts of distinct pixels in the image), the CSSD may be represented as:

$$CSSD[I,J] = H_J \cdot P \cdot H_I' \quad (7)$$

where P is a symmetric-centrosymmetric (or bisymmetric) matrix of the form:

$$P(i,j) = (i-j)^2 \quad (8)$$

Furthermore, techniques such as a symmetric-centrosymmetric matrix vector multiplication technique may be employed to precompute the $(P \cdot H_I')$ term in Eqn. (8), thereby reducing the computation of the CSSD in Eqn. (7) to a dot-product of 1D vectors. The CSSD cost function of Eqn. (7) represents a dissimilarity cost between a pair of slices. This dissimilarity cost may be converted to a similarity cost via use of a non-linear inversion of the CSSD. Accordingly, the similarity cost may be represented as:

$$\hat{CSSD}(I,J) = \frac{1}{1 + (CSSD(I,J))^p} \quad (9)$$

where p is a factor that exaggerates the dissimilarity between the slices and is empirically determined.

It may be noted that the CSSD cost function represented by Eqn. (7) is histogram-based. Also, the all-pair CSSD cost function is robust with respect to conventional histogram-based dissimilarity measures that depend on the size and number of histogram bins and the non-uniformities in the features of interest. Furthermore, Eqn. (9) may be employed to generate a cost matrix C between all pairs of slices.

Once the cost matrix C is generated, this cost-matrix C may be used to identify one or more longest common matching regions in both the reference image volume 104 and the target image volume 106. In one embodiment, the one or more longest common matching regions may be identified by determining a straight line that corresponds to a set of contiguous matching slices in both the image volumes 104, 106. To that end, in accordance with aspects of the present technique, a simple, robust and physically sound approach for slice matching by imposing a non-crossing constraint is presented.

Figure 3:
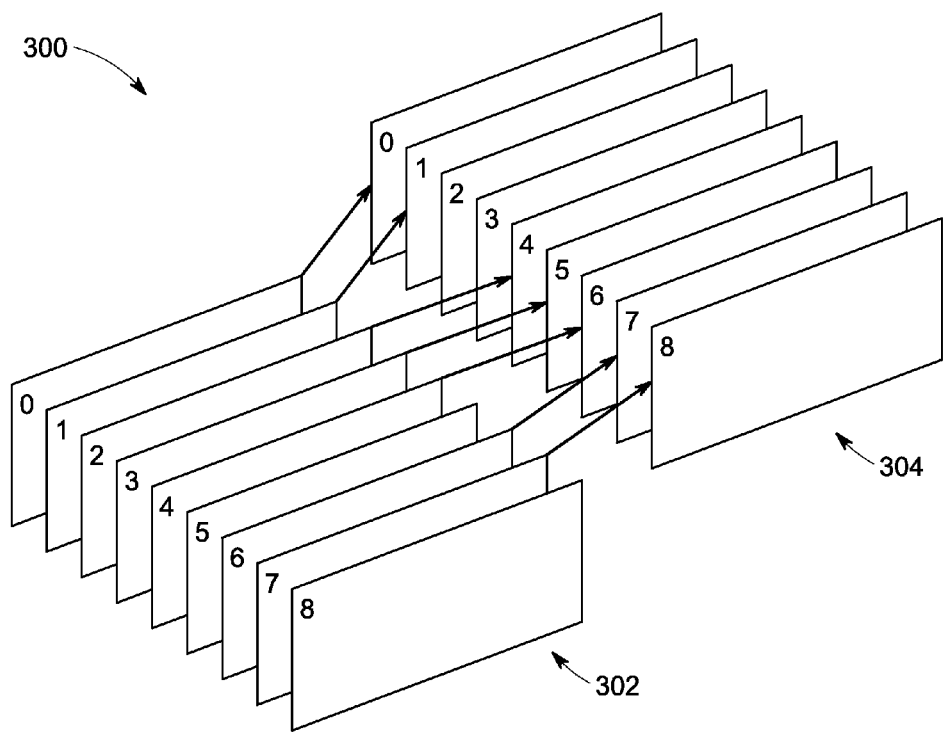
FIG. 3 is a pictorial representation of a maximal weighted non-crossing matching of slices, in accordance with aspects of the present disclosure.

Turning now to FIG. 3, a pictorial representation 300 of non-crossing matching of image slices, in accordance with aspects of the present technique, is illustrated. It may be noted that if the problem of slice matching is presented as a crossing problem, all image slices in the reference image volume 104 are matched with a corresponding slice in the target image volume 106. However, this form of matching may not be desirable when solving the mismatch problem due to the crossover of matched image slices. The crossover of image slices disadvantageously results in an erroneous matching of image slices that are representative of the anatomical region of interest.

Accordingly, as depicted in FIG. 3, a non-crossing matching of slices that advantageously circumvents the crossover problem is presented. Furthermore, in accordance with aspects of the present technique, the image slices of the reference image volume 104 and the target image volume 106 may be considered as nodes of a bipartite graph. Accordingly, the matching problem of FIG. 3 may be formulated as a maximum weighted, non-crossing matching (MWNCM) problem, thereby circumventing the cross-over problem associated with certain currently available techniques. As will be appreciated, arcs in a bipartite graph represent the cost or affinity or any other semantic between disjoint pairs of nodes. A maximal-weighted matching entails computation of a sum of all combinations of these arc weights and selection of a combination that results in a maximum. This formulation is known as a maximal-weighted matching and can be effectively implemented using the Hungarian algorithm, for example. However, this algorithm may result in an undesirable "crossed matching" of the image slices. Thus, in addition to the maximal-weight amongst all arcs, it is also desirable to insure that no two-arcs cross each other. In accordance with aspects of the present technique, the maximal-weighted non-crossing matching (MWNCM) formulation is employed to circumvent the crossed matching problem. The MWNCM technique finds applications in diverse areas such as copyright protection in video streams, operations research, and bioinformatics.

In addition, reference numeral 302 is representative of image slices in the reference image volume 104 (see FIG. 1), while reference numeral 304 is representative of the image slices in the target image volume 106. In the example of FIG. 3, each of the reference image volume 104 and the target image volume 106 is depicted as including eight (8) image slices.

Moreover, in accordance with aspects of the present technique, the MWNCM technique is employed to compute a non-linear, monotonically increasing mapping between the image slices in the reference image volume 104 (see FIG. 1) and image slices in the target image volume 106 (see FIG. 1). Particularly, in order to extract the common matching sub-region, a difference between matching pairs of slices is computed. To that end, matching pairs of image slices are identified. In the example of FIG. 3, the matching pairs of image slices may be identified as $(S_{Ref(0)}, S_{Tgt(0)})$, $(S_{Ref(1)}, S_{Tgt(1)})$, $(S_{Ref(2)}, S_{Tgt(4)})$, $(S_{Ref(3)}, S_{Tgt(5)})$, $(S_{Ref(4)}, S_{Tgt(6)})$, $(S_{Ref(6)}, S_{Tgt(7)})$, and $(S_{Ref(7)}, S_{Tgt(8)})$. It may be noted that some image slices in the reference image volume 104 may not get matched with image slices in the target image volume 106. Subsequently, a difference between the matching pairs of image slices is computed as noted hereinabove. The differences between the matching pairs of image slices of FIG. 3 identified hereinabove are determined as summarized in Table 1.

TABLE 1

| Pair of matched image slices | Difference value |
| --- | --- |
| $(S_{Ref(0)}, S_{Tgt(0)})$ | 0 |
| $(S_{Ref(1)}, S_{Tgt(1)})$ | 0 |
| $(S_{Ref(2)}, S_{Tgt(4)})$ | 2 |
| $(S_{Ref(3)}, S_{Tgt(5)})$ | 2 |
| $(S_{Ref(4)}, S_{Tgt(6)})$ | 2 |
| $(S_{Ref(6)}, S_{Tgt(7)})$ | 1 |
| $(S_{Ref(7)}, S_{Tgt(8)})$ | 1 |

Subsequently, a run-length analysis of these difference values is performed. The common matching sub-region is then identified as the region having the longest run-length in this sequence. In the example of FIG. 3, the longest matching sub-region is deemed as the matching zone for the pairs of image slices. Particularly, in the example of FIG. 3, the longest matching sub-region may be identified from Table 1 as including a longest contiguous set of matching image pairs ($\{(S_{Ref(2)}, S_{Tgt(4)}), (S_{Ref(3)}, S_{Tgt(5)}), (S_{Ref(4)}, S_{Tgt(6)})\}$) based on the run-length of differences between matching reference and target image slices having a value of two (2).

It may be noted that in certain situations multiple contiguous matchings may be obtained. According to aspects of the present technique, these instances of multiple contiguous matchings may be handled by computation of a cumulative cost of each matching using entries in the cost matrix C and selecting the matching having the lowest cost. The matching with the lowest cost is representative of an optimal matching of the image slices in the reference and target image volumes 104, 106.

The method of automated mismatch correction may be described in greater detail with reference to FIGS. 4-10. As previously noted, a plurality of multiple time-point pairs of CT-CT (contrast as well as non-contrast) image data may be obtained from one or more patients. In certain examples, image data corresponding to matching thoracic, abdominal and pelvic regions are obtained.

As previously noted, the image volumes may be processed via use of a thresholding operation to identify a feature of interest in the reference and target image volumes, for example, thereby enhancing the efficiency of the matching process. For example, a count or collection of bone pixels representative of the skeletal system may be considered as the feature of interest. Additionally, the image volumes may be down sampled to normalize a disparity in image slice thickness. FIG. 4 is a pictorial representation 400 of image volumes representative of bones in pelvic and shoulder regions along the axial direction. Analyzing bone profiles in the axial direction, one or more specific regions, such as the shoulder and pelvis, for example, that have similar bone distributions may be identified. For example, a first image volume 402 depicted in FIG. 4(a) may include a coverage from the shoulder to a top part of the abdominal region. Also, a second volume 404 depicted in FIG. 4(b) may include a coverage from the mid-thoracic region to the pelvic region. Accordingly, there is a mismatch in the coverage areas of regions in these two image volumes 402, 404.

In accordance with aspects of the present technique, bone profile plots corresponding to these multiple time-points image volumes 402, 404 may be generated. Processing these bone profile plots via a conventional technique such as a normalized cross-correlation (NCC) technique unfortunately results in multiple peaks, which in turn results in unintended results of matching the pelvis with the shoulder. In accordance with aspects of the present technique, the inherent drawback of the currently available techniques such as the NCC matching technique may be overcome via use of the exemplary method of automated mismatch correction. This method may also be referred to as a Complete Sum-of-Squares Difference-Maximum-Weighted Non-Crossing Matching (CS SD-MWNCM) technique.

FIG. 5 is a graphical representation 500 of use of the method for automated mismatch correction along the axial direction on the image volumes 402, 404 of FIG. 4, in accordance with aspects of the present technique. The exemplary method of mismatch correction may also be referred to as a CSSD-MWNCM technique or method.

In FIG. 5(a), a graphical representation 502 of bone profile plots of the reference image volume 402 (see FIG. 4) and the target image volume 404 (see FIG. 4) is depicted. Reference numeral 504 is representative of a bone profile plot of the reference image volume 402 and reference numeral 506 is a representative of a bone profile plot of the target image volume 404. Also, subsequent to the processing of the reference and target image volumes via the CSSD-MWNCM matching technique, a longest matching region 508 may be identified. It may be noted that the matching region 508 includes a longest contiguous overlapping regions of the bone profile plots of the reference and target image volumes 104, 106. As depicted in FIG. 5, use of the CSSD-MWNCM matching technique advantageously results in the correct region (i.e., the abdomen) in both the image volumes 402, 404 being matched.

Furthermore, FIG. 5(b) depicts a graphical representation 510 of the use of the CSSD-MWNCM technique for the identification of the longest common matching region 508 of FIG. 5(a). Reference numeral 512 represents a MWNCM between the reference and target image volumes 104, 106, while reference numeral 514 represents the longest common region corresponding to this matching. It may be noted that the longest common matching region 508 depicted in FIGS. 5(a) and 5(b) has a span of 5.

FIG. 6 represents a diagrammatic illustration 600 of axial image slices of the reference image volume 402 (see FIG. 4) and the target image volume 404 (see FIG. 4) that correspond to the matching region 508 (see FIG. 5). As depicted in FIG. 6(a), reference numeral 602 is generally representative of the axial image slice corresponding to the reference image volume 402. Also, the axial image slice corresponding to the target image volume 404 is depicted in FIG. 6(b) and is represented by reference numeral 604.

Referring now to FIG. 7, a diagrammatical illustration 700 of a set of coronal image slices that correspond to the axial slices 602, 604 of FIG. 6 is depicted. Particularly, reference numeral 702 is representative of the coronal slice corresponding to the axial image slice 602 of the reference image volume 402 and is depicted in FIG. 7(a), while the coronal image slice corresponding to the axial image slice 604 of the target image volume 404 is represented by reference numeral 704 and is depicted in FIG. 7(b). Also, reference numeral 706 is representative of the identified matching region in the coronal image slice 702 of the reference image volume 404. In addition, reference numeral 706 is representative of the identified matching region in the coronal image slice 704 of the target image volume 406. It may be noted that the matching regions 706, 708 correspond to the matching region 508 of FIG. 5.

The robustness of the CSSD cost function as well as the intrinsic nature of the MWNCM technique aids in ensuring monotonicity when matching regions in the reference and target image volumes. Moreover, as illustrated in FIG. 4, although the shoulder, as well as pelvic regions from both the image volumes 402, 404 (see FIG. 4) may have generally been considered as natural regions for matching, use of the CSSD-MWNCM technique facilitates the identification of the spinal region in the abdomen to be the longest common matching region between both the image volumes 402, 404.

As previously noted, the use of the CSSD-MWNCM technique may lead to the identification of multiple longest common matching regions. FIG. 8 is a diagrammatical representation 800 of a scenario that includes multiple common matching regions. Reference numerals 805 and 806 respectively represent the MWNCM and the longest matching region without the use of any tie-breaking rule, while reference numerals 80 and 808 respectively represent the MWNCM and the longest matching region when a correct tie-breaking rule is used. Moreover, in FIG. 8(a), reference numeral 802 is representative of a first longest common matching region and a second longest common matching region is represented by reference numeral 804. It may be noted that each of the first and second longest common matching regions 802, 804 has a span of 7.

In accordance with aspects of the present technique, use of the cumulative cost of matching regions obtained from the cost matrix C aids in identifying an optimal longest common matching, as previously noted. By way of example, the "tie" between the multiple longest common matching regions 802, 804 is resolved via use of the cumulative cost of the matching regions obtained from the cost matrix C. Particularly, the cumulative cost aids in determining the optimal longest common matching region. In the example of FIG. 8, based on the determined cumulative cost corresponding to the first and second longest common matching regions 802, 804, the second longest common matching region 804 is identified to be representative of the optimal longest common matching region. Failure to use the cumulative-cost of the matching regions obtained from the cost matrix C may lead to an incorrect matching.

FIGS. 8(*b*) and 8(*c*) represent diagrammatical illustrations of axial image slices 812, 814 of the reference image volume and the target image volume respectively that correspond to the first longest common matching region 802 of FIG. 8(*a*). In addition, FIGS. 8(*d*) and 8(*e*) represent a diagrammatical illustrations of axial image slices 822, 824 of the reference image volume and the target image volume respectively that correspond to the second longest common matching region 804 of FIG. 8(*a*). As is evident from FIGS. 8(*b*)-8(*e*), it may be determined that the axial slices 822, 824 that correspond to the second longest common matching region 804 provide an optimal match between the reference and target image volumes.

Additionally, the CSSD cost function is generally invariant to rotation, or more generally, there is a lack of dependence of the CSSD cost function on spatial locations. Hence, rotation in the coronal or sagittal directions will not affect slice matchings in the axial direction.

Referring now to FIG. 9, a pictorial representation 900 of coronal views of a typical two time-point oncology study showing the abdominal region as the region of interest is depicted. A common feature of oncology studies is that coverage area of the organ of interest may be reduced at subsequent time points. For example, as depicted in FIG. 9, it may be noted that a thoracic-abdominal scan 902 of FIG. 9(*a*) is performed at the first time point (reference image), while at a subsequent time point, a scan 904 of FIG. 9(*b*) having a limited coverage area of the abdominal region is obtained (target image). Also, an effort to reduce the exposure to harmful radiation may result in even more limited coverage areas 906 at subsequent time points. The coverage area in a routine oncology study is systematically reduced and matched to the reference image volume, while maintaining the parameter settings. As depicted in FIG. 9, the robustness of the CSSD-MWNCM technique may be demonstrated by identifying matching regions 908, 910 respectively corresponding to the reference and the target image volumes even with reduced coverage areas.

Furthermore, in accordance with aspects of the present technique, a system 1000 for automatic mismatch correction of image volumes is presented. The system 1000 may be configured to acquire image data from a patient 1002 with or without use of an image acquisition device 1004. In one embodiment, the image acquisition device 1004 may include a probe, where the probe may include an invasive probe or a non-invasive probe that is configured to aid in the acquisition of image data. Also, in certain other embodiments, image data may be acquired via other means.

The system 1000 may also include at least one medical imaging system 1008 that is in operative association with the image acquisition device 1004. It should be noted that although the exemplary embodiments illustrated hereinafter are described in the context of a medical imaging system, other imaging systems and applications such as industrial imaging systems and non-destructive evaluation and inspection systems, such as pipeline inspection systems, liquid reactor inspection systems, are also contemplated. Additionally, the exemplary embodiments illustrated and described hereinafter may find application in multi-modality imaging systems that employ computed tomography imaging in conjunction with other imaging modalities, position-tracking systems or other sensor systems. Furthermore, it may also be noted that although the exemplary embodiments illustrated hereinafter are described in the context of a medical imaging system, such as a CT imaging system, use of other imaging systems, such as, but not limited to, a magnetic resonance (MR) imaging system, an X-ray imaging system, or other imaging systems is also contemplated in accordance with aspects of the present technique.

In a presently contemplated configuration, the medical imaging system 1008 may include an acquisition subsystem 1020 and a processing subsystem 1022. Further, the acquisition subsystem 1020 of the medical imaging system 1008 may be configured to acquire image data representative of one or more anatomical regions of interest in the patient 1002. The image data or image volumes acquired from the patient 1002 may then be processed by the processing subsystem 1022. As previously noted, a plurality of image volumes representative of an anatomical region of interest in the patient 1002 may be acquired at different points in time may be acquired.

Additionally, the image data acquired and/or processed by the medical imaging system 1008 may be employed to aid a clinician in identifying disease states, assessing need for treatment, determining suitable treatment options, and/or monitoring the effect of treatment on the disease states. It may be noted that the terms treatment and therapy may be used interchangeably. In certain embodiments, the processing subsystem 1022 may be further coupled to a storage system, such as a data repository 1026, where the data repository 1026 is configured to receive and/or store the acquired image volumes and/or the processed image data.

In accordance with exemplary aspects of the present technique, the processing subsystem 1022 may include a mismatch correction platform 1024 that is configured to aid in the automated mismatch correction of the acquired longitudinal image volumes as previously described with reference to FIGS. 1-9. The mismatch correction platform 1024 is configured to enhance the efficiency of the matching process. To that end, the mismatch correction platform 1024 is configured to process the image volumes via a thresholding operation, for example, to identify a feature of interest in the image volumes. Additionally, the mismatch correction platform 1024 is also configured to down sample the image volumes to normalize any disparity in the thickness of image slices in the plurality of image volumes. Furthermore, the system 1000 and more particularly, the mismatch correction platform 1024 is configured to compute a cost matrix by computing a CSSD cost function between all pairs of image slices. Also, the mismatch correction platform 1024 is configured to process this cost function by implementing a MWNCM technique to determine a unique matching between the image volumes by identifying a longest common matching region between the image volumes.

Also, the processing subsystem 1022 or the mismatch correction platform 1024 is configured to align the reference and target image volumes based on the identified longest common matching region. To that end, the mismatch correction platform 1024 is configured to determine a displacement between the reference image volume and the target image volume, compute an offset between the reference image volume and the target image volume based on the determined displacement, estimating a transform, such as a linear translation of the target image volume based on the computed offset, and aligning the reference image volume and the target image volume based on the estimated transform, as previously described with reference to FIG. 1. Once the reference and target image volumes are aligned, the mismatch correction platform 1024 is also configured to aid in the registration of the corrected image volumes.

Further, as illustrated in FIG. 10, the medical imaging system 1008 may include a display 1028 and a user interface 1030. In certain embodiments, such as in a touch screen, the display 1028 and the user interface 1030 may overlap. Also, in some embodiments, the display 1028 and the user interface 1030 may include a common area. In accordance with aspects of the present technique, the display 1028 of the medical imaging system 1008 may be configured to display an image generated by the medical imaging system 1008 based on the acquired image data. Additionally, the image volumes, the longest common matching regions, the registered image, and the like may be visualized on the display 1028.

In addition, the user interface 1030 of the medical imaging system 1008 may include a human interface device (not shown) configured to facilitate the clinician in manipulating image data displayed on the display 1028. The human interface device may include a mouse-type device, a trackball, a joystick, a stylus, or a touch screen configured to facilitate the clinician to identify the one or more regions of interest requiring therapy. However, as will be appreciated, other human interface devices, such as, but not limited to, a touch screen, may also be employed. Furthermore, in accordance with aspects of the present technique, the user interface 1030 may be configured to aid the clinician in navigating through the images acquired by the medical imaging system 1008.

Furthermore, the foregoing examples, demonstrations, and process steps such as those that may be performed by the system may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository 1026 or memory.

The methods and systems described hereinabove present an exemplary approach for mismatch correction in longitudinal oncology studies. Use of invariant features from bone voxels to compute an all-pair cost function between slices, followed by use of a maximum-weighted non-crossing matching (MWNCM) technique aids in the identification of the longest overlapping region between a pair of image volumes. Additionally, a tie-breaking rule to correctly identify the optimal longest common matching region when multiple longest common matching regions with the same length are identified facilitates the selection of an optimal matching region. Additionally, the automatic mismatch correction technique described hereinabove allows registration of longitudinal oncology studies without any explicit pair-wise slice registration. Moreover, the method entails use of a dissimilarity measure between invariant features in image volumes, coupled with a graph-based non-crossing matching criterion. Furthermore, the robust method for automated mismatch correction of image volumes allows matching of image volumes with severely constrained coverage areas, thereby enhancing the quality of diagnosis, therapy and/or follow-up studies.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method for automatic mismatch correction, the method comprising:
   identifying a feature of interest in a reference image volume and a target image volume;
   computing a cost matrix based on one or more pairs of image slices in the reference image volume and the target image volume;
   identifying one or more longest common matching regions in the reference image volume and the target image volume based on the computed cost matrix; and
   aligning the reference image volume and the target image volume based on the identified one or more longest common matching regions.

2. The method of claim 1, further comprising acquiring one or more image volumes representative of an object of interest at different points in time.

3. The method of claim 2, wherein the reference image volume and the target image volume are representative of the images acquired at different points in time.

4. The method of claim 3, further comprising standardizing a feature space of each of the reference image volume and the target image volume.

5. The method of claim 3, wherein the feature of interest in the reference image volume and the target image volume comprises bone pixels in the reference image volume and the target image volume, an anatomical region in the object of interest, a curvature of the object of interest, an intensity of the object of interest, a derivation of the object of interest, or combinations thereof.

6. The method of claim 5, wherein computing the cost matrix comprises determining a similarity cost for each pair of slices in the reference image volume and the target image volume.

7. The method of claim 5, wherein determining the similarity cost comprises computing a sum-of-squares difference of each identified feature of interest in the reference image volume with each identified feature of interest in the target image volume.

8. The method of claim 7, wherein identifying the one or more longest common regions comprises identifying a line corresponding to a set of contiguous matching image slices in the reference image volume and the target image volume.

9. The method of claim 8, wherein identifying the line corresponding to the set of contiguous matching image slices in the reference image volume and the target image volume comprises:
imposing a non-crossing constraint on the reference image volume and the target image volume; and
computing a non-linear monotonically increasing mapping between the image slices in the reference image volume and the image slices in the target image volume.

10. The method of claim 9, further comprising extracting at least one common matching region between the image slices in the reference image volume and the image slices in the target image volume.

11. The method of claim 10, further comprising identifying an optimal common matching region, wherein identifying an optimal common matching region comprises:
computing a difference between each matching pair of image slices;
determining a run length of the computed difference values; and
identifying the difference values with a longest run length.

12. The method of claim 11, further comprising:
computing a cumulative cost of each matching set of contiguous image slices based on corresponding entries in the cost matrix;
identifying a cumulative cost with a lowest value; and
selecting a matching set of contiguous image slices corresponding to the cumulative cost with the lowest value.

13. The method of claim 11, wherein aligning the reference image volume and the target image volume comprises:
determining a displacement between the reference image volume and the target image volume;
computing an offset between the reference image volume and the target image volume based on the determined displacement;
estimating a transform of the target image volume based on the computed offset; and
aligning the reference image volume and the target image volume based on the estimated transform.

14. The method of claim 13, further comprising registering the reference image volume and the target image volume based on the identified longest common matching region to generate a registered image.

15. The method of claim 14, further comprising performing an automated mismatch correction on a sub-region of interest in the registered image.

16. A non-transitory computer readable medium comprising one or more tangible media, wherein the one or more tangible media comprise:
code adapted to identify a feature of interest in a reference image volume and a target image volume;
code adapted to compute a cost matrix based on one or more pairs of image slices in the reference image volume and the target image volume;
code adapted to identify one or more longest common matching regions in the reference image volume and the target image volume based on the computed cost matrix; and
code adapted to align the reference image volume and the target image volume based on the identified one or more longest common matching regions.

17. A correction system, comprising:
a mismatch correction platform configured to:
identify a feature of interest in a reference image volume and a target image volume;
compute a cost matrix based on one or more pairs of image slices in the reference image volume and the target image volume;
identify one or more longest common matching regions in the reference image volume and the target image volume based on the computed cost matrix; and
align the reference image volume and the target image volume based on the identified one or more longest common matching regions.

18. The correction system of claim 17, wherein the mismatch correction platform is configured to compute the cost matrix by determining a similarity cost for each pair of slices in the reference image volume and the target image volume.

19. The correction system of claim 18, wherein the mismatch correction platform is configured to:
identify the one or more longest common regions by identifying a line corresponding to a set of contiguous matching image slices in the reference image volume and the target image volume; and
extract a common matching region between the image slices in the reference image volume and the image slices in the target image volume.

20. The correction system of claim 19, wherein the mismatch correction platform is configured to register the reference image volume and the target image volume based on the identified common matching region.

21. An imaging system, comprising:
an acquisition subsystem configured to acquire image data, wherein the image data is representative of an anatomical region in an object of interest;
a processing subsystem in operative association with the acquisition subsystem and comprising a mismatch correction platform configured to:
identify a feature of interest in a reference image volume and a target image volume;
compute a cost matrix based on one or more pairs of image slices in the reference image volume and the target image volume;
identify one or more longest common matching regions in the reference image volume and the target image volume based on the computed cost matrix;
align the reference image volume and the target image volume based on the identified one or more longest common matching regions; and
register the reference image volume and the target image volume to generate a registered image.

22. The system of claim 21, wherein the mismatch correction platform is further configured to perform an automated mismatch correction on a sub-region of interest in the registered image.

* * * * *